(12) United States Patent
Kanahara et al.

(10) Patent No.: US 10,033,218 B2
(45) Date of Patent: Jul. 24, 2018

(54) NON-CONTACT CHARGER

(71) Applicant: HONDA MOTOR CO., LTD., Tokyo (JP)

(72) Inventors: Hirokazu Kanahara, Wako (JP);
Shigenori Hiruta, Wako (JP);
Toshihiro Kojima, Wako (JP);
Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 14/959,114

(22) Filed: Dec. 4, 2015

(65) Prior Publication Data
US 2016/0164335 A1    Jun. 9, 2016

(30) Foreign Application Priority Data

Dec. 5, 2014    (JP) .................................. 2014-246818

(51) Int. Cl.
| | |
|---|---|
| *H02J 7/00* | (2006.01) |
| *H02J 7/02* | (2016.01) |
| *H02J 7/04* | (2006.01) |
| *H02J 50/10* | (2016.01) |

(Continued)

(52) U.S. Cl.
CPC ............ *H02J 7/025* (2013.01); *H02J 7/0042* (2013.01); *H02J 7/0044* (2013.01); *H02J 7/04* (2013.01); *H02J 50/10* (2016.02); *H02J 50/40* (2016.02); *H02J 50/90* (2016.02); *H02J 2007/0001* (2013.01); *Y02E 60/7853* (2013.01)

(58) Field of Classification Search
CPC .. H02J 7/025; H02J 7/0047; H02J 2007/0001; H02J 50/10; H02J 50/90; H02J 50/80; H02J 7/0044; H02J 50/40; B23P 15/26; Y02E 60/7853
See application file for complete search history.

(56) References Cited

U.S. PATENT DOCUMENTS

| | | | | |
|---|---|---|---|---|
| 6,650,088 | B1 * | 11/2003 | Webb .................... | H02J 7/0044 320/115 |
| 7,952,322 | B2 * | 5/2011 | Partovi .................. | H01F 5/003 320/108 |

(Continued)

FOREIGN PATENT DOCUMENTS

JP    2009-247194 A    10/2009

*Primary Examiner* — Helen Rossoshek
(74) *Attorney, Agent, or Firm* — Westerman, Hattori, Daniels & Adrian, LLP (57) ABSTRACT

A non-contact charger includes a position detector, a determination unit, a primary coil, a coil moving unit, and a controller. The position detector detects placement of an electronic device, which incorporates a secondary coil, onto a top plate of the non-contact charger. The determination unit determines whether the electronic device is placed onto the top plate of the non-contact charger from a lateral direction. When the determination unit determines that the electronic device is placed onto the top plate from the lateral direction, the controller instructs the coil moving unit to wait for a predetermined period of time in moving the primary coil. After the waiting for the predetermined period of time to delay the movement of the primary coil, the controller moves the primary coil toward a position of the secondary coil of the electronic device.

9 Claims, 8 Drawing Sheets

(51) Int. Cl.
   *H02J 50/40* (2016.01)
   *H02J 50/90* (2016.01)

(56) References Cited

U.S. PATENT DOCUMENTS

| | | | | | |
|---|---|---|---|---|---|
| 8,362,744 | B2* | 1/2013 | Terao | ............... | H01F 38/14 307/104 |
| 9,318,912 | B2* | 4/2016 | Baarman | ............... | H04B 5/0037 |
| 9,318,913 | B2* | 4/2016 | Pijnenburg | ............... | H02J 7/025 |
| 2011/0227527 | A1* | 9/2011 | Zhu | ............... | H02J 7/0044 320/108 |
| 2012/0052923 | A1* | 3/2012 | Park | ............... | H02J 7/025 455/567 |
| 2012/0139484 | A1* | 6/2012 | Gunderman | ............... | H02J 7/025 320/108 |
| 2012/0161697 | A1* | 6/2012 | Park | ............... | G06F 1/263 320/108 |
| 2012/0235638 | A1* | 9/2012 | Pijnenburg | ............... | H02J 7/022 320/108 |
| 2012/0294463 | A1* | 11/2012 | Chu | ............... | H04M 1/6041 381/150 |
| 2012/0326659 | A1* | 12/2012 | Shukuya | ............... | H02J 7/025 320/108 |
| 2013/0278207 | A1* | 10/2013 | Yoo | ............... | H02J 7/025 320/108 |
| 2013/0307470 | A1* | 11/2013 | Watanabe | ............... | H02J 7/025 320/108 |
| 2014/0152244 | A1* | 6/2014 | Rautiainen | ............... | H02J 5/005 320/108 |
| 2014/0191717 | A1* | 7/2014 | Hong | ............... | H02J 5/005 320/108 |
| 2014/0203770 | A1* | 7/2014 | Salter | ............... | H02J 7/0047 320/108 |
| 2014/0253024 | A1* | 9/2014 | Rautiainen | ............... | H02J 7/025 320/108 |
| 2014/0253030 | A1* | 9/2014 | Moon | ............... | H02J 7/025 320/108 |
| 2014/0266030 | A1* | 9/2014 | Park, II | ............... | H01F 27/34 320/108 |
| 2015/0194837 | A1* | 7/2015 | Tom | ............... | H02J 7/025 320/108 |
| 2015/0216273 | A1* | 8/2015 | Akin | ............... | A45B 25/00 135/16 |
| 2015/0229156 | A1* | 8/2015 | Iwabuchi | ............... | B60L 11/182 320/108 |
| 2015/0380970 | A1* | 12/2015 | Vu | ............... | H02J 7/025 320/108 |
| 2016/0013679 | A1* | 1/2016 | Jeon | ............... | H02J 7/025 320/108 |
| 2016/0072334 | A1* | 3/2016 | Wu | ............... | H02J 50/90 320/108 |
| 2016/0141884 | A1* | 5/2016 | Lee | ............... | H02J 17/00 307/104 |
| 2016/0218545 | A1* | 7/2016 | Schroeder | ............... | H02J 7/025 |
| 2017/0070076 | A1* | 3/2017 | Karanikos | ............... | H02J 7/025 |

* cited by examiner

NON-CONTACT CHARGER

CROSS REFERENCES TO RELATED APPLICATIONS

The present application claims priority under 35 U.S.C. § 119 to Japanese Patent Application No. 2014-246818, filed Dec. 5, 2014, entitled "NON-CONTACT CHARGER." The contents of this application are incorporated herein by reference in their entirety.

BACKGROUND

1. Field

The present disclosure relates to a non-contact charger.

2. Description of the Related Art

Hitherto, there has been a non-contact charger of the type that, when a battery built-in device is placed on an upper plate of a charging stand incorporating a power supply coil (primary coil), a position detection controller detects a position of the battery built-in device, and a moving mechanism moves the power supply coil to come closer to an induction coil (secondary coil) of the battery built-in device (see, for example, Japanese Unexamined Patent Application Publication No. 2009-247194). In trying to perform charging by utilizing electromagnetic induction, generally, a problem of reduction in efficiency of the charging occurs if a position of the primary coil on the power sending side and a position of the secondary coil on the power receiving side are not aligned with each other. To cope with such a problem, in the above non-contact charger of the related art, the primary coil is constituted to be movable such that the battery built-in device can be charged with good efficiency regardless of a position on the upper plate where the battery built-in device is placed, insofar as the position is within a movable range of the primary coil.

SUMMARY

However, when the charging stand for the above non-contact charger of the related art is equipped in a vehicle, it is not always ensured for the reason of space efficiency or restriction from the viewpoint of design that the battery built-in device is placed onto the charging stand from right above. In the case of embedding the charging stand in an instrument panel, for example, because a large space cannot be secured above the charging stand due to a positional relation relative to other components arranged within the instrument panel, the battery built-in device needs to be placed onto the charging stand in a way of sliding the battery built-in device to a position above the charging stand from a lateral direction. In such a case, if the placement of the battery built-in device on the charging stand is detected before the battery built-in device is fully pushed into a predetermined inner position, the primary coil is moved to be aligned with the position detected at that time. Thereafter, when the battery built-in device is fully pushed into the predetermined inner position, the primary coil is moved again to be aligned with the predetermined inner position. Therefore, the number of times that the primary coil is moved increases, thus raising a problem that a user feels unpleasant due to operating noise, e.g., motor noise generated from the moving mechanism.

There are known not only the moving coil type in which one primary coil is moved, but also the array coil type in which a plurality of primary coils is arranged and one of the primary coils closest to an electronic device is selected. In the array coil type, unpleasantness due to the motor noise is not generated. However, unpleasantness may occur due to, e.g., feedback noise that is undesirably generated with movement of the electronic device, because a charger tries to start charging at a position of the electronic device where the electronic device is detected by the primary coil on the side closer to an entrance opening of the charger. In other words, a problem arises in that the user may feel unpleasant due to, e.g., the feedback noise that is undesirably generated from the electronic device at a time when the charger tries to start the charging in spite of the position of the electronic device being still moved over a top plate of the charger.

In consideration of the above-described situations, the present application proposes a non-contact charger in which a primary coil can be avoided from being moved unnecessarily.

The present application is constituted as follows.

(1) A non-contact charger (e.g., a non-contact charger 12 in an embodiment) according to one aspect of this application includes a primary coil (e.g., a primary coil 33 in the embodiment) incorporated in a case (e.g., a case 12a in the embodiment), a detector (e.g., a position detector 31 in the embodiment) that detects placement of an electronic device (e.g., an electronic device 11 in the embodiment), which incorporates a secondary coil (e.g., a secondary coil 21 in the embodiment), onto a top plate (e.g., a top plate 12b in the embodiment) defining an upper surface of the case, and a controller (e.g., a controller 35 in the embodiment) that starts charging of the electronic device through the primary coil when the electronic device is detected by the detector, wherein the non-contact charger further includes a determination unit (e.g., a determination unit 32 in the embodiment) that determines whether the electronic device is placed onto the top plate from a lateral direction, and when the determination unit determines that the electronic device is placed onto the top plate from the lateral direction, the controller starts the charging after control of waiting for a predetermined constant time to delay the start of the charging.

With the non-contact charger described in above (1), when the placement of the electronic device onto the top plate of the non-contact charger from the lateral direction is detected, it is estimated with a high probability that the position of the electronic device on the top plate is further moved after that time. In such a case, the charging can be prevented from being started in a state where the position of the electronic device is not yet fixedly set. As a result, a user can be avoided from feeling unpleasant due to, e.g., feedback noise that is undesirably generated from the electronic device.

(2) In the non-contact charger described in above (1), preferably, when a position of the electronic device is changed within a determination time, which is shorter than the predetermined period of time, from a position of the electronic device at a time when the placement of the electronic device onto the top plate has been first detected by the detector, the determination unit determines that the electronic device is placed onto the top plate from the lateral direction.

In the case of above (2), the placement of the electronic device from the lateral direction can be properly determined by employing change in the position of the electronic device, the position being detected by the detector, without necessity of providing any additional component.

(3) In the non-contact charger described in above (2), preferably, the determination unit is configured to be able to detect a magnitude of movement of the position of the electronic device, and detects the magnitude of movement of the position of the electronic device plural times at a predetermined time interval, thereby detecting a change in the magnitude of the movement one after another through the intermittent detections of the positions, and the controller delays the start of the charging by the predetermined period of time that is given as a time until detecting that the change in the magnitude of movement of the position of the electronic device detected through the plural time detections exhibits a decreasing tendency in the magnitude of the movement after the determination unit has determined that the electronic device has been placed onto the top plate from the lateral direction.

In the case of above (3), the charging can be started at proper timing at which it is estimated with a high probability that the movement of the electronic device over the top plate has been completed.

(4) In the non-contact charger described in above (2), preferably, the determination unit detects the position of the electronic device plural times at a predetermined time interval, and the controller delays the start of the charging through the predetermined period of time that is given as a time until results of detecting the position of the electronic device the plural times indicate substantially the same position in succession a predetermined number of times after the determination unit has determined that the electronic device has been placed onto the top plate from the lateral direction.

In the case of above (4), the charging can be started at proper timing at which it is estimated with a high probability that the movement of the electronic device over the top plate has been completed.

(5) In the non-contact charger described in any one of above (1) to (4), preferably, the primary coil includes a moving mechanism (e.g., a coil moving unit 34 in the embodiment) that is movable in two-dimensional directions along a surface of the top plate, and the controller instructs the moving mechanism to move the primary coil to a position of the secondary coil, the position being detected by the detector, at the start of the charging, and delays the start of the charging by instructing the moving mechanism to wait for a predetermined period of time in moving the primary coil.

In the case of above (5), under condition, for example, that in spite of the primary coil being moved toward the position where the placement of the electronic device has been first detected, the secondary coil is not present at the detected position, it is possible to avoid the necessity of executing undesired extra operations of determining the position of the secondary coil again, and then moving the primary coil again toward the newly determined position of the secondary coil.

(6) In the non-contact charger described in any one of above (1) to (4), preferably, the primary coil is arranged plural along a surface of the top plate, and the controller selects one of the primary coils closest to a position of the secondary coil, the position being detected by the detector, at the start of the charging, and delays the start of the charging by instructing a wait for a predetermined period of time in selecting the one primary coil.

In the case of above (6), it is possible to suppress, e.g., feedback noise at the start of the charging from being undesirably generated from the electronic device, for example, when the charger tries to start the charging at a position where the placement of the electronic device has been first detected, in spite of the position of the electronic device being still moved over the top plate of the charger.

(7) In the non-contact charger described in any one of above (1) to (6), preferably, the case is disposed at a predetermined location in a vehicle cabin, and another component (e.g., another component 3 in the embodiment) disposed in the vehicle cabin is located at a position spaced upwards from the top plate through a predetermined distance.

In the case of above (7), when the non-contact charger is mounted in, e.g., an instrument panel or a center console of a vehicle, the primary coil can be prevented from being operated unnecessarily even with the presence of the other component above the top plate.

(8) In the non-contact charger described in above (7), preferably, the other component located at the position spaced upwards from the top plate through the predetermined distance covers the entire top plate when looking at the top plate in a plan view.

In the case of above (8), since the non-contact charger is arranged in a state not projecting outwards relative to the other component that is embedded inside an interior surface of the vehicle, a space of the vehicle cabin can be increased, and the non-contact charger can be protected against, e.g., an object that may otherwise fall onto the top plate. Thus, the non-contact charger can be prevented from being operated unnecessarily even in the layout allowing the electronic device to be easily placed onto the non-contact charger from the lateral direction relative to the top plate.

(9) In the non-contact charger described in any one of above (1) to (8), preferably, the case is disposed at a predetermined location in a vehicle cabin, the top plate has a substantially rectangular shape, and wall surfaces (e.g., wall surfaces 4 in the embodiment) defined by another component disposed in the vehicle cabin are formed near an outer periphery of the top plate along at least one side of the substantially rectangular shape.

In the case of above (9), when the wall surface is present in some of the surroundings of the top plate, it is estimated with a high probability that the electronic device is placed onto the non-contact charger in a manner of pressing the electronic device against the wall surface in a first step. Even when the non-contact charger is disposed in a space defined by that wall surface, the primary coil can be prevented from being operated unnecessarily.

(10) In the non-contact charger described in above (9), preferably, the wall surfaces include a wall surface (e.g., a rear-side wall surface 6 in the embodiment) including an opening (e.g., an opening 5 in the embodiment) formed only along predetermined one side of the substantially rectangular shape of the top plate and opened to inside of the vehicle cabin, and the wall surface in which the opening is formed has a slope (e.g., a slope 7 in the embodiment) that guides the electronic device toward the top plate from the inside of the vehicle cabin.

In the case of above (10), the electronic device can be smoothly placed onto the top plate even in the case where the other component is present above the top plate. Hence convenience in use can be improved. Moreover, the primary coil can be prevented from being operated unnecessarily even in the layout allowing the electronic device to be easily moved over the top plate.

DESCRIPTION OF THE PREFERRED EMBODIMENT

A non-contact charger according to one embodiment will be described below with reference to the accompanying drawings.

Figure 1:
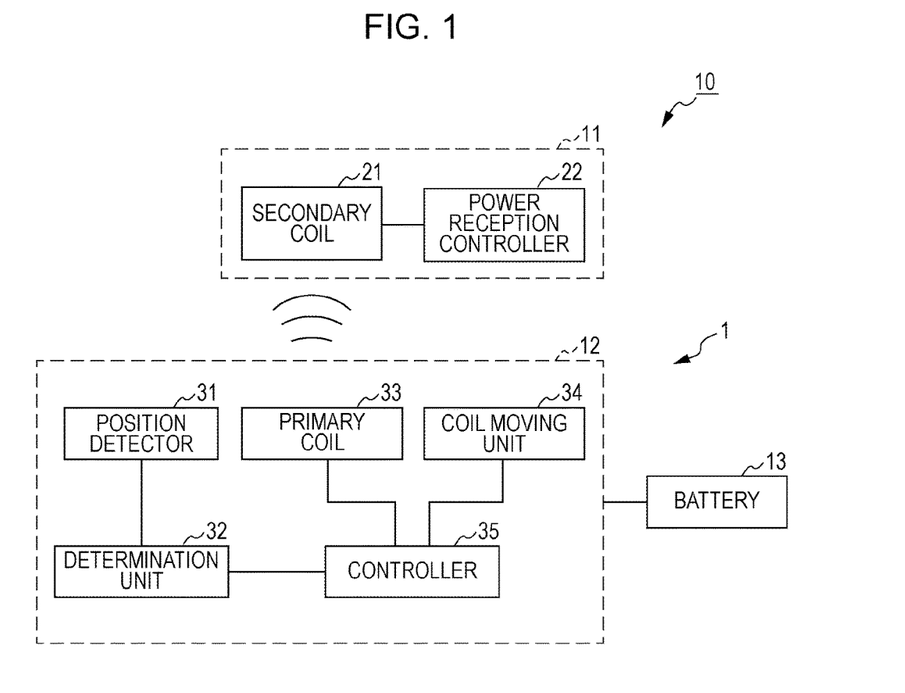
FIG. 1 is a block diagram of a non-contact charger according to an embodiment.
Figure 2:
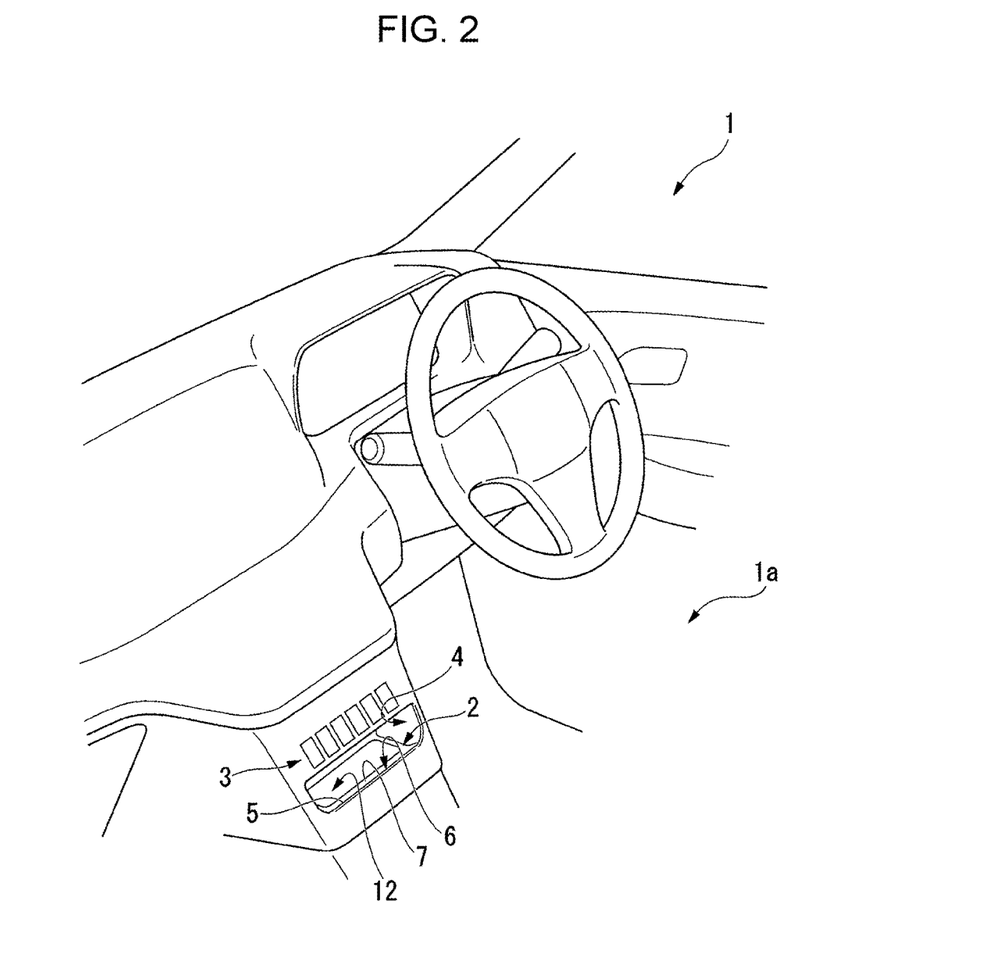
FIG. 2 is a schematic perspective view illustrating a part of the interior of a vehicle equipped with the non-contact charger according to the embodiment.
Figure 3:
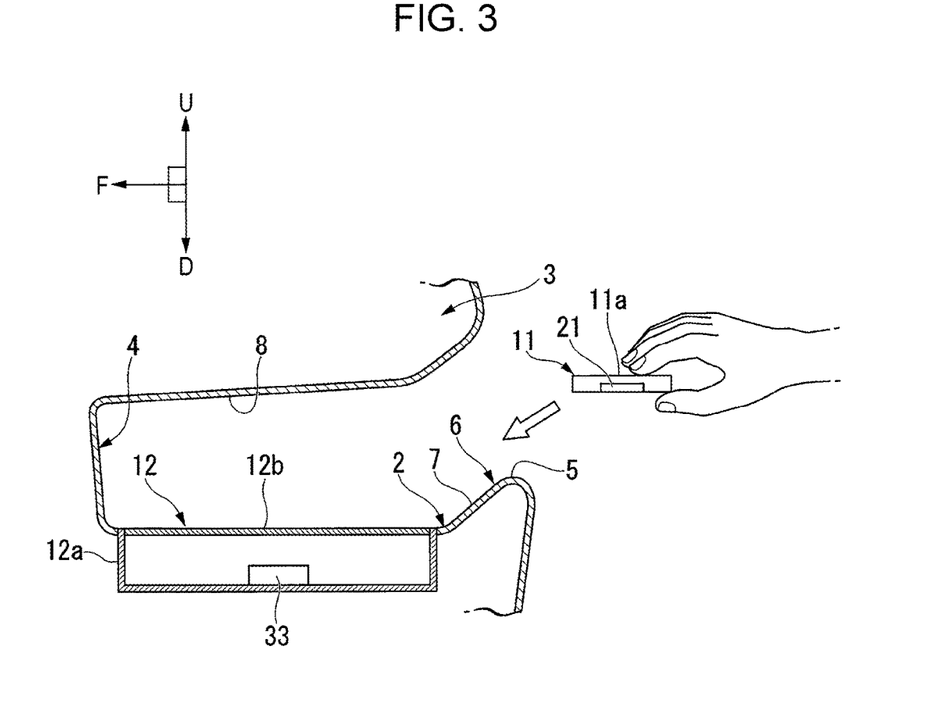
FIG. 3 is a schematic sectional view illustrating a part of the vehicle in which the non-contact charger according to the embodiment is equipped.

As illustrated in FIG. 1, a non-contact charging system 10 according to the embodiment includes an electronic device 11 and a non-contact charger 12. The electronic device 11 is, for example, a portable device such as an information terminal possessed by a passenger of a vehicle 1. As illustrated in FIGS. 1 to 3, the non-contact charger 12 is equipped in the vehicle 1 including a battery 13 and so on.

The electronic device 11 includes a secondary coil 21 and a power reception controller 22.

As illustrated in FIG. 3, the secondary coil 21 is incorporated in a housing 11a of the electronic device 11. The secondary coil 21 generates an electromotive force through electromagnetic induction with magnetic flux generated from a later-described primary coil 33 of the non-contact charger 12.

The power reception controller 22 includes a CPU, a ROM, and a RAM. When electric power is sent from the primary coil 33 of the non-contact charger 12 to the secondary coil 21, the power reception controller 22 changes a load of the secondary coil 21, thereby varying reflected impedance. The power reception controller 22 transmits, to the non-contact charger 12, various information signals by utilizing variations of reflected power, which are generated in the primary coil 33 of the non-contact charger 12 corresponding to the variations of the reflected impedance of the electronic device 11. The power reception controller 22 transmits, as the various information signals, signals representing identification information specific to the electronic device 11, received power, a charging rate, a charging stop request, abnormality information, etc. to the non-contact charger 12.

As illustrated in FIGS. 2 and 3, the non-contact charger 12 is disposed in a cabin 1a of the vehicle 1 (namely in the interior of the vehicle), e.g., inside a tray 2 formed in an instrument panel or a dashboard. A top plate 12b (described later) of the non-contact charger 12 is exposed to a surface of the tray 2. The tray 2 is defined by wall surfaces 4 of another component 3 of the vehicle 1 at sides in surface directions (facing the front side of the vehicle, the right side of the vehicle, the left side of the vehicle, the upper side of the vehicle, and the rear side of the vehicle).

The wall surfaces 4 include a rear-side wall surface 6 where an opening 5 opened to the vehicle cabin a is formed, and the rear-side wall surface 6 has a slope 7 gradually inclining in a downward direction D toward the interior of the tray 2 positioned closer to the front side of the vehicle from an opening end positioned closer to the rear side of the vehicle. The slope 7 guides the electronic device 11 with respect to the top plate 12b when the electronic device 11 is inserted into the tray 2 in a forward direction F toward the front of the vehicle 1 from the side including the vehicle cabin 1a.

The wall surfaces 4 include an upper-side wall surface 8 that is arranged at a position spaced from the tray 2 through a predetermined distance in an upward direction U, and the upper-side wall surface 8 that entirely covers the top plate 12b of the non-contact charger 12, described later, when looking at the tray 2 in a plan view.

Figure 4:
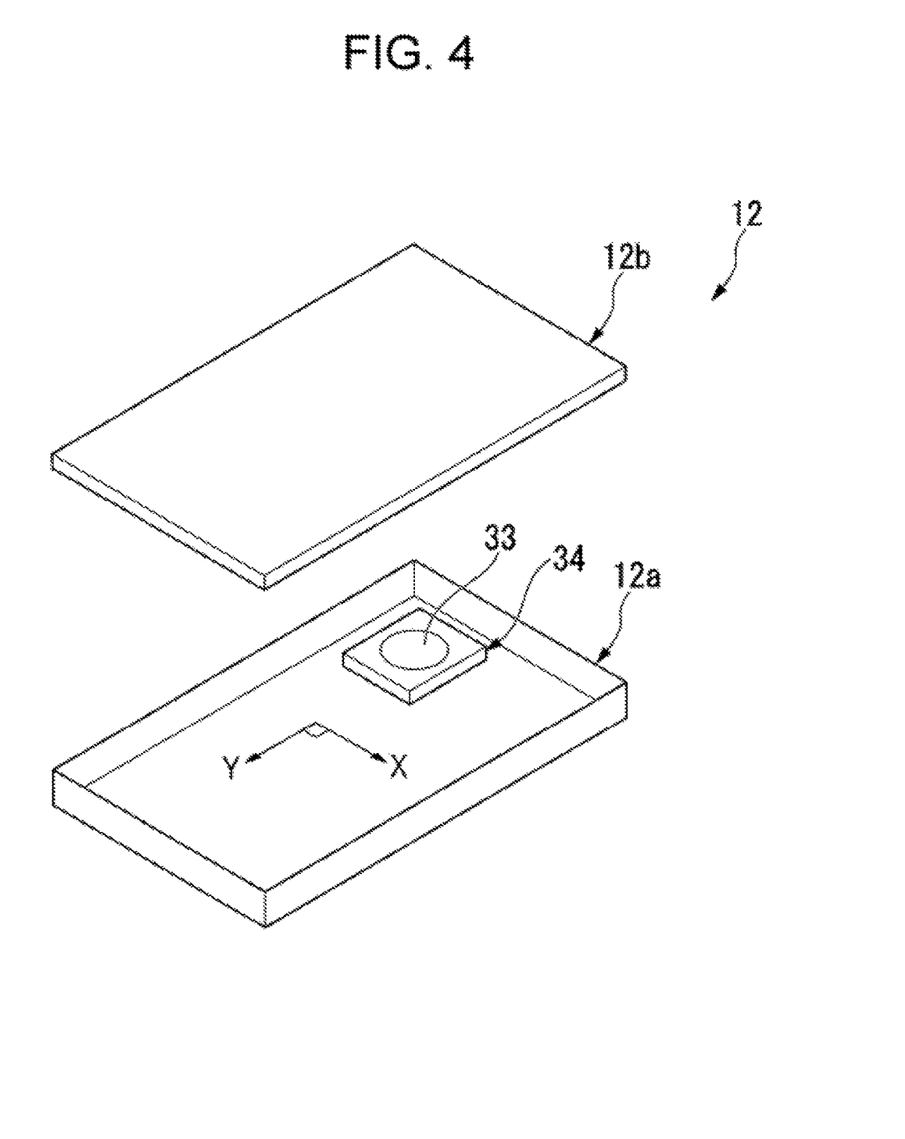
FIG. 4 is a schematic exploded perspective view of the non-contact charger according to the embodiment.

As illustrated in FIGS. 3 and 4, the non-contact charger 12 has an external configuration in the form of a rectangular box. As illustrated in FIGS. 1 and 4, the non-contact charger 12 includes a position detector 31, a determination unit 32, a primary coil 33, a coil moving unit 34, and a controller 35. The primary coil 33 and the coil moving unit 34 are incorporated in a case 12a, for example. The position detector 31, the determination unit 32, and the controller 35 are mounted, for example, to the top plate 12b in the form of a lid defining an upper surface of the case 12a on which the electronic device 11 is to be placed.

The position detector 31 includes a matrix coil (not illustrated) formed by detection coils that are arranged in a mesh pattern. The position detector 31 detects placement of the electronic device 11, which incorporates the secondary coil 21, onto the top plate 12b through communication between the detection coils and the secondary coil 21 of the electronic device 11. The position detector 31 detects a position of the secondary coil 21 (i.e., a position of the electronic device 11) in a two-dimensional coordinate system (e.g., an XY orthogonal coordinate system) on the matrix coil.

On the basis of change in the position of the secondary coil 21, the position being detected by the position detector 31, the determination unit 32 determines whether the electronic device 11 is placed onto the top plate 12b from a lateral direction. The determination unit 32 determines whether the position of the electronic device 11 is changed beyond a predetermined range within a specific determination time from the position of the electronic device 11 at a point in time when the placement of the electronic device 11 onto the top plate 12b has been first detected by the position detector 31. If the position of the electronic device 11 is changed beyond the predetermined range within the specific determination time, the determination unit 32 determines that the electronic device 11 is placed onto the top plate 12b from the lateral direction. In other words, the determination unit 32 detects a situation that the electronic device 11 is placed on the top plate 12b from the lateral direction in a state where the electronic device 11 and the position detector 31 are so closed as to be able to detect change in the position of the electronic device 11 on the top plate 12b.

The specific determination time is set, for example, to a time necessary for the position detector 31 to detect the position of the electronic device 11 a predetermined number of times (e.g., several times) in a process of repeatedly executing the detection. The determination unit 32 detects the position of the electronic device 11 or a magnitude of movement of the position of the electronic device 11 (e.g., a moving speed or a moving acceleration of the electronic device 11) plural times at a predetermined time interval.

The primary coil 33 generates magnetic flux intersecting the secondary coil 21 upon electric power being supplied to the primary coil 33 from the battery 13.

The coil moving unit 34 includes a motor, a driving mechanism, etc., which cooperatively move the primary coil 33.

The controller 35 includes a CPU, a ROM, and a RAM. The controller 35 controls the operation of the non-contact charger 12 in a supervising manner. The controller 35 drives and controls the coil moving unit 34 depending on the position of the secondary coil 21 detected by the position detector 31, thereby moving the primary coil 33 such that the primary coil 33 is positioned to face the secondary coil 21.

If it is determined by the determination unit 32 that the electronic device 11 is placed onto the top plate 12b from the lateral direction, the controller 35 moves the primary coil 33 toward the position of the secondary coil 21 after instructing the coil moving unit 34 to wait for a predetermined period of time to delay start of the movement of the primary coil 33. The predetermined period of time is set to a time longer than the specific determination time in the determination unit 32.

After delaying the start of the movement of the primary coil 33 through the predetermined period of time, the controller 35 moves the primary coil 33 toward the position of the secondary coil 21 at timing at which the results of detecting the magnitude of movement of the position of the electronic device 11 several times by the determination unit 32 are turned to indicate a tendency that the detected magnitude decreases.

The controller 35 converts DC power output from the battery 13 to AC power, and supplies the AC power to the primary coil 33. With the supply of the power to the primary coil 33 under control of the controller 35, the magnetic flux intersecting the secondary coil 21 is generated, and an electromotive force is generated in the secondary coil 21 through electromagnetic induction with the intersecting magnetic flux. During a period in which electric power is sent from the primary coil 33 to the secondary coil 21, the controller 35 receives various information signals that are transmitted from the secondary coil 21 by utilizing variations of the reflected power, which are generated in the primary coil 33.

In an initial state, e.g., at startup of charging, the controller 35 supplies electric power to the primary coil 33 to such an extent as substantially equivalent to that in an actual charging state, and receives the various information signals transmitted from the secondary coil 21. On the basis of the information received from the secondary coil 21 and representing the received power, as well as the output power of the primary coil 33, the controller 35 determines whether the intensity of the power received by the secondary coil 21 is not less than a predetermined value, thus detecting whether the electronic device 11 is placed on the non-contact charger 12.

Upon detecting a state that the electronic device 11 is placed on the non-contact charger 12, the controller 35 starts the actual charging after executing various processes, such as authentication on the basis of identification information received from the secondary coil 21, and recognition of the demanded power requested by the electronic device 11.

The non-contact charger 12 according to the embodiment is constituted as described above. One example of the operation of the non-contact charger 12 will be described below with reference to FIGS. 5, 6 and 7.

Figure 5:
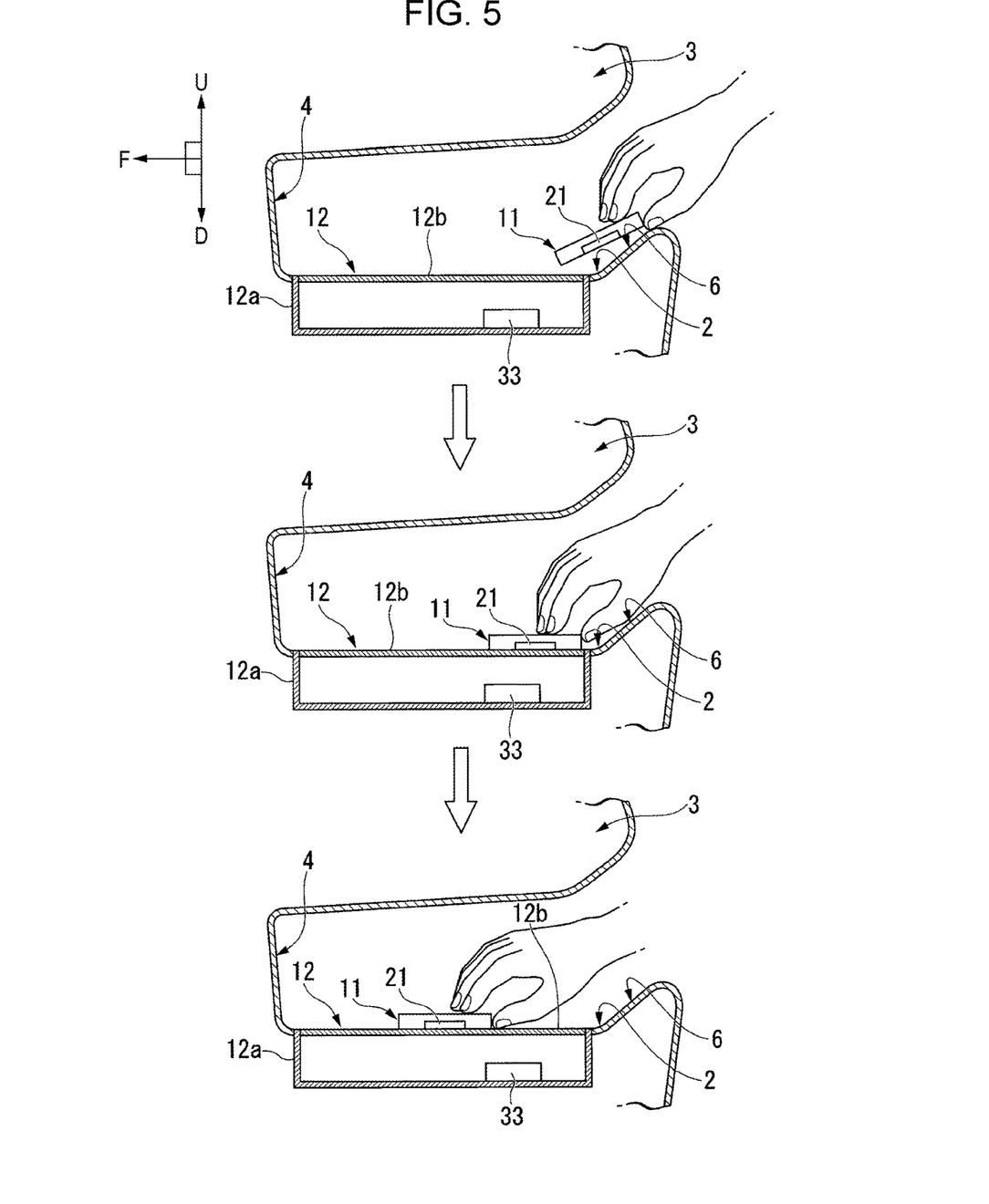
FIG. 5 illustrates, by way of example, a state where an electronic device is placed on a top plate of the non-contact charger according to the embodiment, the state being changed sequentially.
Figure 6:
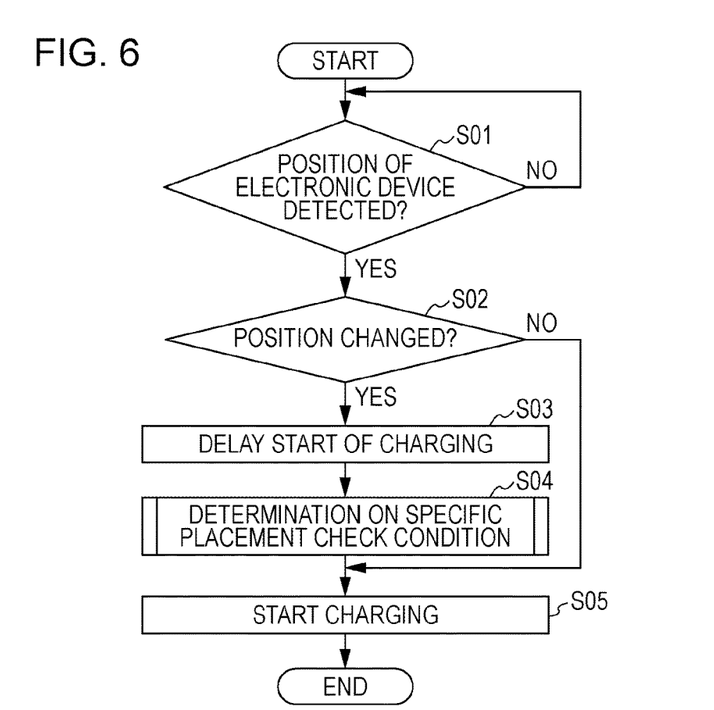
FIG. 6 is a flowchart illustrating an example of the operation of the non-contact charger according to the embodiment.
Figure 7:
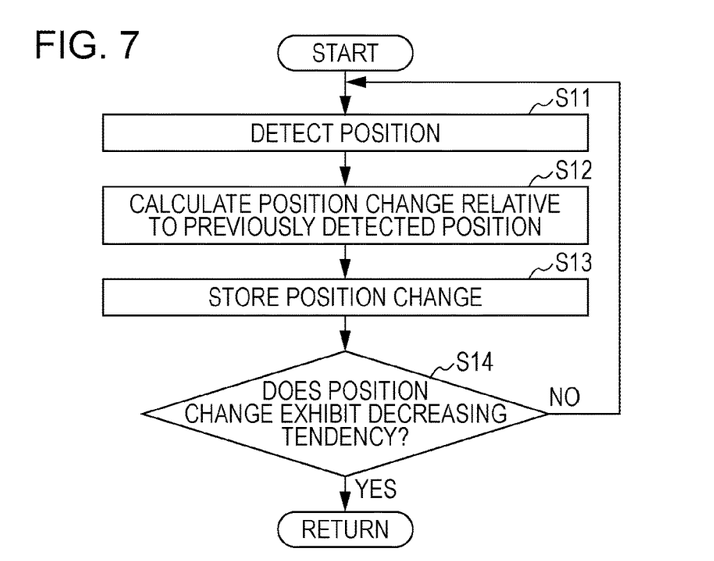
FIG. 7 is a flowchart illustrating a determination process on a specific placement check condition in the flowchart of FIG. 6.

In the following, the operation of the non-contact charger 12 when a user places the electronic device 11 onto the non-contact charger 12 in the tray 2, as illustrated in FIG. 5, is described with reference to flowcharts of FIGS. 6 and 7.

First, the controller 35 determines whether the position of the secondary coil 21 (i.e., the position of the electronic device 11) is detected by the position detector 31 (step S01).

If the result of the determination in step S01 is "NO", the controller 35 repeats the process of step S01.

On the other hand, if the result of the determination in step S01 is "YES", the controller 35 advances the processing flow to step S02.

Next, the determination unit 32 determines whether the position of the secondary coil 21 is changed beyond the predetermined range within the specific determination time (step S02), by employing a previous value of the position of the secondary coil 21, which has been stored in the previous cycle of processing, and a present value of the position of the secondary coil 21, which is detected in the present cycle of processing.

If the result of the determination in step S02 is "NO", the controller 35 advances the processing flow to step S05 described later.

On the other hand, if the result of the determination in step S02 is "YES", the controller 35 advances the processing flow to step S03 described later.

Next, the controller 35 delays the start of the movement of the primary coil 33 by the coil moving unit 34 and the start of charging (step S03).

Next, the controller 35 executes a later-described determination process on a specific placement check condition (step S04).

Next, the controller 35 instructs the coil moving unit 34 to move the primary coil 33 to the position of the secondary coil 21, and instructs the start of the charging to the secondary coil 21 from the primary coil 33 (step S05). The controller 35 then ends a series of the processes described above.

The determination process on the specific placement check condition in above step S04 will be described below.

The controller 35 instructs the position detector 31 to detect the position of the secondary coil 21 (step S11).

Next, the determination unit 32 calculates a magnitude of movement of the position of the secondary coil 21 (step S12) by employing the previous value of the position of the secondary coil 21, which has been stored in the previous cycle of processing, and the present value of the position of the secondary coil 21, which is detected in the present cycle of processing.

Next, the determination unit 32 stores the calculated magnitude of movement of the position of the secondary coil 21 (step S13).

Next, the determination unit 32 determines whether the magnitude of movement of the position of the secondary coil 21 is changed in a decreasing tendency (step S14).

If the result of the determination in step S14 is "NO", the controller 35 returns the processing flow to step S11 described above.

On the other hand, if the result of the determination in step S14 is "YES", the controller 35 advances the processing flow to "RETURN" upon judgement that the movement of the electronic device 11 over the top plate 12b has been completed with a high probability.

With the non-contact charger 12 according to the embodiment, as described above, when the placement of the electronic device 11 onto the top plate 12b of the non-contact charger 12 from the lateral direction is detected, it is estimated with a high probability that the position of the electronic device 11 on the top plate 12b is further changed. In such a case, the primary coil 33 is prevented from being moved unnecessarily by delaying the start of the movement of the primary coil 33 through the predetermined period of time that corresponds to a time until the magnitude of movement of the position of the secondary coil 21 is turned to exhibit a decreasing tendency. Under condition, for example, that in spite of the primary coil 33 being moved toward the position where the placement of the electronic device 11 has been first detected, the secondary coil 21 is not present at the detected position, it is possible to avoid the necessity of executing undesired extra operations of determining the position of the secondary coil 21 again, and then moving the primary coil 33 again toward the newly determined position of the secondary coil 21. Thus, since the start of the charging is delayed through the predetermined period of time when the placement of the electronic device 11 onto the top plate 12b of the non-contact charger 12 from the lateral direction is detected, the charging can be prevented from being started in a state where the position of the electronic device 11 is not yet fixedly set. As a result, unpleasantness can be reduced which is attributable to, for example, feedback noise generated unnecessarily in the electronic device 11.

Furthermore, the placement of the electronic device 11 from the lateral direction can be properly determined by employing change in the position of the electronic device 11, the position being detected by the position detector 31, without necessity of providing any additional component.

Moreover, the movement of the primary coil 33 and the charging can be started at proper timing at which it is estimated with a high probability that the movement of the electronic device 11 over the top plate 12b has been completed.

When the non-contact charger 12 is mounted in, e.g., an instrument panel or a center console of the vehicle 1, the primary coil 33 can be prevented from being operated unnecessarily even with the presence of the other component 3 above the top plate 12b.

Since the non-contact charger 12 is arranged in a state not projecting outwards relative to the other component 3 that is embedded inside an interior surface of the vehicle 1, a space of the vehicle cabin 1a can be increased, and the non-contact charger 12 can be protected against, e.g., an object that may otherwise fall onto the top plate 12b. Thus, the primary coil 33 can be prevented from being operated unnecessarily even in the layout allowing the electronic device 11 to be easily placed onto the non-contact charger 12 from the lateral direction relative to the top plate 12b.

When the wall surfaces 4 are partly present in some of the surroundings of the top plate 12b, it is estimated with a high probability that the electronic device 11 is placed onto the non-contact charger 12 in a manner of pressing the electronic device 11 against the part of the wall surfaces 4 in a first step. Even when the non-contact charger 12 is disposed in a space defined by those wall surfaces 4, the primary coil 33 can be prevented from being operated unnecessarily.

Since, among the wall surfaces 4 around the tray 2, the rear-side wall surface 6 in which the opening 5 opened to the vehicle cabin 1a has the slope 7, the electronic device 11 can be smoothly placed onto the top plate 12b even in the case where the other component 3 is present above the top plate 12b. Hence convenience in use can be improved. Moreover, even in the layout allowing the electronic device 11 to be easily moved over the top plate 12b with the aid of the slope 7, the primary coil 33 can be prevented from being operated unnecessarily.

A first modification of the above-described embodiment will be described below.

In the above-described embodiment, the controller 35 executes control of waiting for a predetermined period of time to delay the start of the movement of the primary coil 33 and the start of the charging, the predetermined period of time corresponding to the time until the determination unit 32 determines that the result of detecting the magnitude of movement of the position of the electronic device 11 is turned to exhibit a decreasing tendency. However, the present application is not limited to the above-described embodiment.

The controller 35 may execute the control of waiting for a predetermined period of time to delay the start of the movement of the primary coil 33 and the start of the charging, the predetermined period of time corresponding to a time until the determination unit 32 determines that the results of detecting the position of the electronic device 11 plural times indicate substantially the same position in succession a predetermined number of times.

Figure 8:
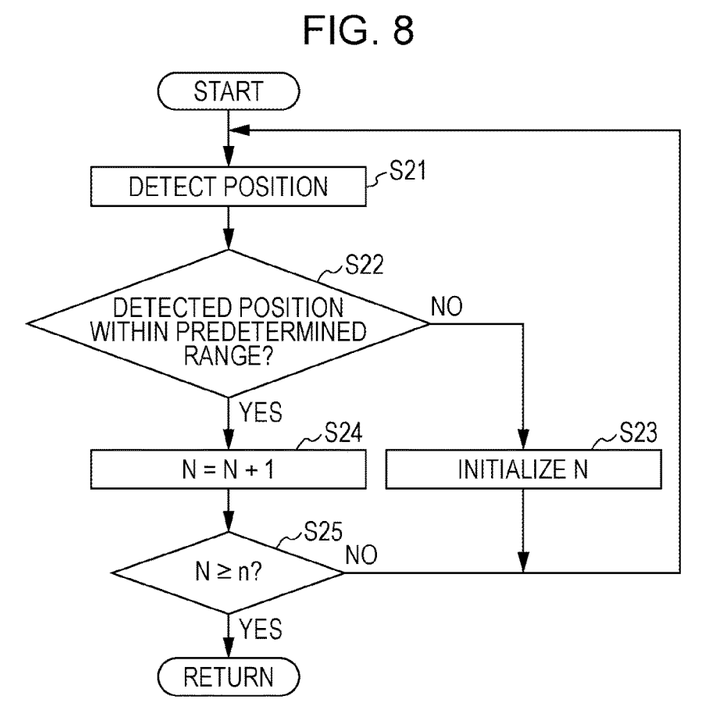
FIG. 8 is a flowchart illustrating a determination process on a specific placement check condition in a first modification of the embodiment.

In the following, the operation of the non-contact charger 12 according to the first modification when the user places the electronic device 11 onto the non-contact charger 12 in the tray 2, as illustrated in FIG. 5, is described with reference to the flowcharts of FIGS. 6 and 8.

A determination process on a specific placement check condition in above step S04 will be described below.

First, the controller 35 instructs the position detector 31 to detect the position of the secondary coil 21 by (step S21).

Next, the determination unit 32 determines whether the position of the secondary coil 21 detected by the position detector 31 (called the detected position) is within a predetermined range that is set to make determination whether plural different positions can be regarded as substantially the same position (step S22).

If the result of the determination in step S22 is "NO", the controller 35 advances the processing flow to step S23.

On the other hand, if the result of the determination in step S22 is "YES", the controller 35 advances the processing flow to step S24.

In the former case, the controller 35 initializes a parameter N to zero (step S23). The controller 35 then returns the processing flow to above step S21.

In the latter case, the controller 35 adds "1" to the parameter N (step S24). The controller 35 then advances the processing flow to step S25.

Next, the determination unit 32 determines whether the parameter N is not less than a predetermined value n that is 2 or larger (step S25).

If the result of the determination in step S25 is "NO", the controller 35 returns the processing flow to above step S21.

On the other hand, if the result of the determination in step S25 is "YES", the controller 35 advances the processing flow to "RETURN" upon judgement that the movement of the electronic device 11 over the top plate 12b has been completed with high probability.

According to the first modification, the primary coil 33 can be prevented from being operated unnecessarily with the control of waiting for a predetermined period of time to delay the start of the movement of the primary coil 33, the predetermined period of time corresponding to the time until the results of detecting the position of the electronic device 11 are determined substantially as the same position in succession the predetermined number of times.

A second modification of the above-described embodiment will be described below.

In the above-described embodiment, the controller 35 executes the control of waiting for a predetermined period of time to delay the start of the movement of the primary coil 33 and the start of the charging, the predetermined period of time corresponding to the time until the determination unit 32 determines that the result of detecting the magnitude of movement of the position of the electronic device 11 is turned to exhibit a decreasing tendency. However, the present application is not limited to the above-described embodiment.

The controller 35 may execute the control of waiting for a predetermined constant time to delay the start of the movement of the primary coil 33 and the start of the charging.

Figure 9:
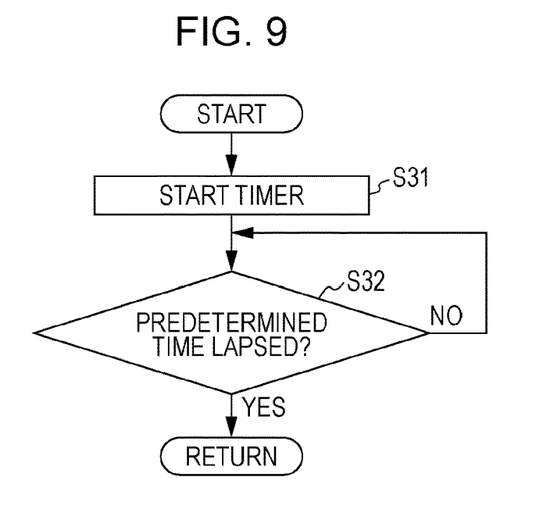
FIG. 9 is a flowchart illustrating a determination process on a specific placement check condition in a second modification of the embodiment.

In the following, the operation of the non-contact charger 12 according to the second modification when the user places the electronic device 11 onto the non-contact charger 12 in the tray 2, as illustrated in FIG. 5, is described with reference to the flowcharts of FIGS. 6 and 9.

A determination process on a specific placement check condition in above step S04 will be described below.

First, the controller 35 starts time counting by a timer (step S31).

Next, the controller 35 determines whether a predetermined period of time has lapsed from the start of time counting by the timer, namely from start of delaying the movement of the primary coil 33 (step S32).

If the result of the determination in step S32 is "NO", the controller 35 makes control to repeatedly execute the determination process of step S32.

On the other hand, if the result of the determination in step S32 is "YES", the controller 35 advances the processing flow to "RETURN".

A third modification of the above-described embodiment will be described below.

While, in the above-described embodiment, the controller 35 makes control to determine, in the above-described process of step S02, whether the position of the secondary coil 21 is changed beyond the predetermined range within the specific determination time, the present application is not limited to the above-described embodiment.

The controller 35 may determine, in the above-described process of step S02, whether the magnitude of movement of the position of the secondary coil 21 is turned to exhibit a decreasing tendency within the predetermined period of time.

A fourth modification of the above-described embodiment will be described below.

While, in the above-described embodiment, the non-contact charger 12 is constituted as the so-called moving coil type in which the primary coil 33 is a movable coil, the present application is not limited to the above-described embodiment.

Figure 10:
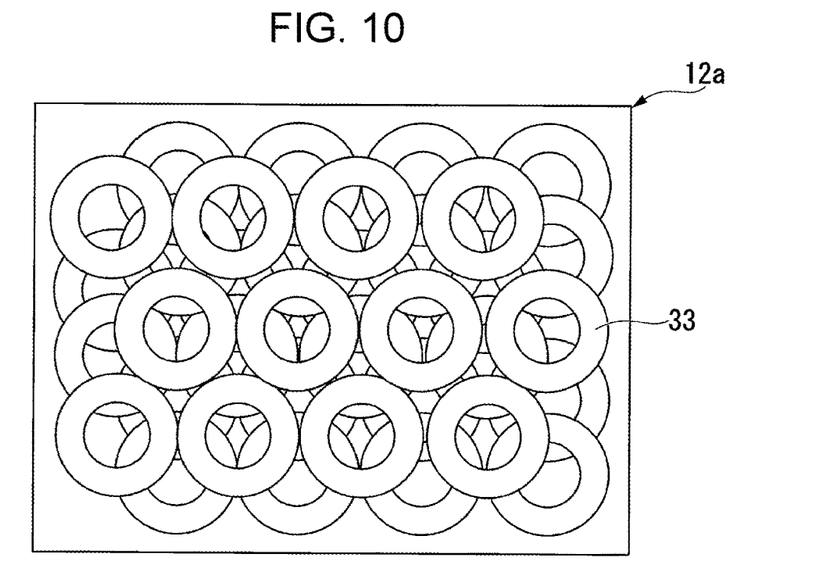
FIG. 10 is a schematic plan view of a non-contact charger according to a fourth modification of the embodiment.

The non-contact charger 12 may be, instead of the moving coil type, the multi-coil type (array coil type) including a plurality of primary coils 33 as illustrated in FIG. 10. The coil moving unit 34 is omitted in the non-contact charger 12 of the array coil type.

The non-contact charger 12 according to the fourth modification includes a plurality of primary coils 33 that are incorporated in the case 12a. The plural primary coils 33 are arranged along the surface of the top plate 12b.

At start of the charging, the controller 35 in the non-contact charger 12 selects one of the primary coils 33, which is present closest to the position of the secondary coil 21 detected by the position detector 31. If the determination unit 32 determines that the electronic device 11 is placed onto the top plate 12b from the lateral direction, the controller 35 delays the start of the charging by instructing a wait for a predetermined period of time in selecting the primary coil 33.

According to the fourth modification, the charging can be prevented from being started in a state where the position of the electronic device 11 is still moved over the top plate 12b of the non-contact charger 12. Moreover, the user can be avoided from feeling unpleasant due to, e.g., the feedback noise that is undesirably generated from the electronic device 11 at a time when the charger tries to start the charging.

A fifth modification of the above-described embodiment will be described below.

Figure 11:
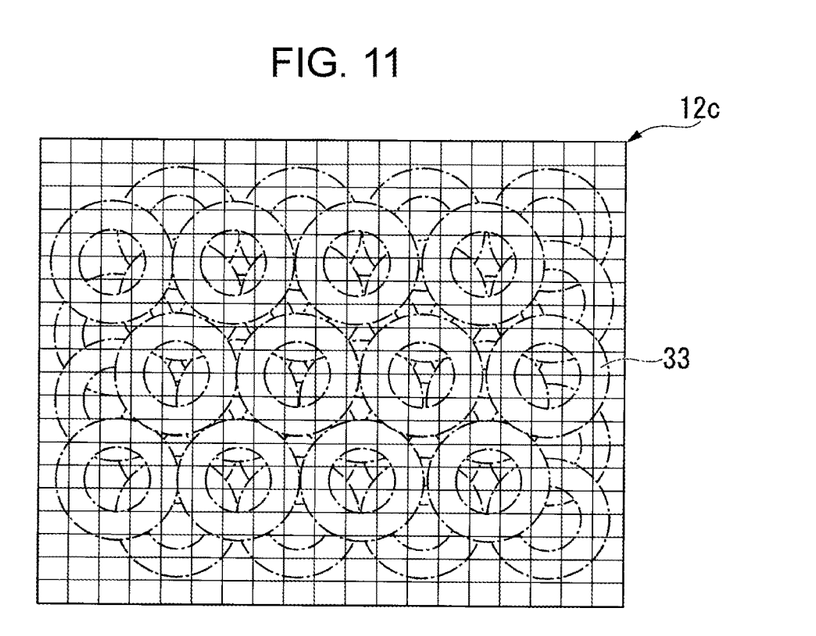
FIG. 11 is a schematic plan view of the non-contact charger according to the fourth modification of the embodiment.

In the above-described fourth modification of the embodiment, the position detector 31 in the non-contact charger 12 includes, as illustrated in FIG. 11, a matrix coil 12c formed by detection coils arranged in a mesh-like pattern, as in the embodiment described above. However, modifications of the embodiment are not limited to the fourth modification. More specifically, in the above-described fourth modification of the embodiment, the position detector 31 detects the placement of the electronic device 11, which incorporates the secondary coil 21, onto the top plate 12b through communication between the matrix coil 12c and the secondary coil 21 of the electronic device 11. For that purpose, the position detector 31 detects the position of the secondary coil 21 (i.e., the position of the electronic device 11) in a two-dimensional coordinate system defined on the matrix coil 12c.

On the other hand, in the fifth modification of the above-described embodiment, the matrix coil 12c may be omitted from the position detector 31.

The position detector 31 in the fifth embodiment detects the placement of the electronic device 11, which incorporates the secondary coil 21, onto the top plate 12b through communication between each of the plural primary coils 33 and the secondary coil 21 of the electronic device 11. Thus, the position detector 31 detects the position of the secondary coil 21 (i.e., the position of the electronic device 11) in a two-dimensional coordinate system defined on the plural primary coils 33 that are arranged along the surface of the top plate 12b.

The secondary coil 21 is not limited to the type incorporated in the housing 11a of the electronic device 11. A secondary coil incorporated in a member (e.g., a protective case), which can be additionally fitted to the housing 11a of the electronic device 11, should be also construed as the secondary coil 21 that is incorporated in the electronic device 11.

It is as a matter of course that, while this application has been described above as forming the slope 7 in a portion of the wall surfaces 4, the portion defining the wall surface positioned at the side closest to the vehicle cabin, this application can also be suitably employed in such a structure that the slope 7 is not formed and the electronic device 11 is placed onto the top plate 12b just from the lateral direction (i.e., a direction parallel to the surface of the top plate 12b).

The embodiment of the present disclosure is disclosed merely illustrative and is not intended to limit the scope of the disclosure. The embodiment can be practiced in other various forms as well, and various omissions, replacements, and alterations can be made on the embodiment within the range not departing from the gist of the disclosure. Those various embodiments and modifications are involved within not only the scope and the gist of the disclosure, but also the range regarded as equivalent to the disclosure defined in Claims.

What is claimed is:

1. A non-contact charger comprising:
a case having a top plate having an upper surface onto which an electronic device having a secondary coil is to be placed;
a primary coil installed in the case;
a detector that is installed in the case and detects a position of the electronic device on the upper surface of the top plate of the case;
a controller capable of a start of charging of the electronic device through the primary and secondary coils when the electronic device on the upper surface of the top plate is detected by the detector; and
wherein the controller delays the start of the charging of the electronic device by a predetermined period of time when a change of the position of the electronic device is detected before elapse of a predetermined determination period of time after a placement of the electronic device onto the top plate is first detected by the detector, and
wherein the predetermined determination period of time for detecting the change of the position of the electronic device is shorter than the predetermined period of time during which the charging of the electronic device is delayed.

2. The non-contact charger according to claim 1, wherein the detector is configured to periodically detect the position of the electronic device at a predetermined time interval,
the non-contact charger further comprises a determination unit configured to determine that the electronic device is placed onto the top plate from a lateral direction along the upper surface of the top plate when the change of the position of the electronic device is detected before elapse of the predetermined determination period of time after the placement of the electronic device onto the top plate is first detected by the detector,
the determination unit is further configured to detect a magnitude of movement of the electronic device each time when the position of the electronic device is detected at the predetermined time interval, and
the controller detects a change in the magnitude of movement detected one after another at the predetermined time interval and detects an elapsed time after the determination unit determines that the electronic device is placed onto the top plate from the lateral direction and before the determination unit detects that the change in the magnitude of movement of the electronic device starts to decrease, the elapsed time being set to be the predetermined period of time.

3. The non-contact charger according to claim 1, wherein the detector is configured to periodically detect the position of the electronic device at a predetermined time interval,
the non-contact charger further comprises a determination unit configured to determine that the electronic device is placed onto the top plate from a lateral direction along the upper surface of the top plate when the change of the position of the electronic device is detected before elapse of the predetermined determination period of time after the placement of the electronic device onto the top plate is first detected by the detector, and
the determination unit detects an elapsed time after the determination unit determines that the electronic device is placed onto the top plate from the lateral direction and before the determination unit determines that the positions of the electronic device detected in succession a predetermined number of times are substantially the same as one another, the elapsed time being set to be the predetermined period of time.

4. The non-contact charger according to claim 1, further comprising a moving mechanism configured to move the primary coil in two-dimensional directions along a surface of the top plate, and
the controller controls the moving mechanism to move the primary coil to a position of the secondary coil of the electronic device detected by the detector for starting the charging, and delays the moving of the primary coil by the predetermined period of time.

5. The non-contact charger according to claim 1, wherein the primary coil is arranged at each of different locations along a surface of the top plate, and
the controller selects one of the primary coils which is closest to a position of the secondary coil of the electronic device detected by the detector for starting the charging, and delays the selection of said one of the primary coils to start the charging by the predetermined period of time.

6. The non-contact charger according to claim 1, wherein the case is disposed at a predetermined location in a vehicle cabin, in which the vehicle cabin has a component which is disposed above the top plate of the case and defines an opened space having a predetermined height from the top plate of the case.

7. The non-contact charger according to claim 6, wherein the component of the vehicle cabin covers the opened space over the top plate entirely in a plan view of the component.

8. The non-contact charger according to claim 1, wherein the top plate of the case has a substantially rectangular shape with periphery side edges, and the case is disposed at a predetermined location in a vehicle cabin and provided with a wall surface extending from at least one of the periphery side edges of the top plate in the vehicle cabin.

9. The non-contact charger according to claim 8, wherein the vehicle cabin has a hollow space a bottom of which is the top plate of the case, the hollow space having an opening opened to the vehicle cabin along one of the periphery side edges of the top plate, the opening of the hollow space being provided with a guide surface extending inward from the opening toward said one of the periphery side edges of the top plate and having a slope that guides the electronic device onto the top plate from the vehicle cabin.

* * * * *